Patented Oct. 26, 1937

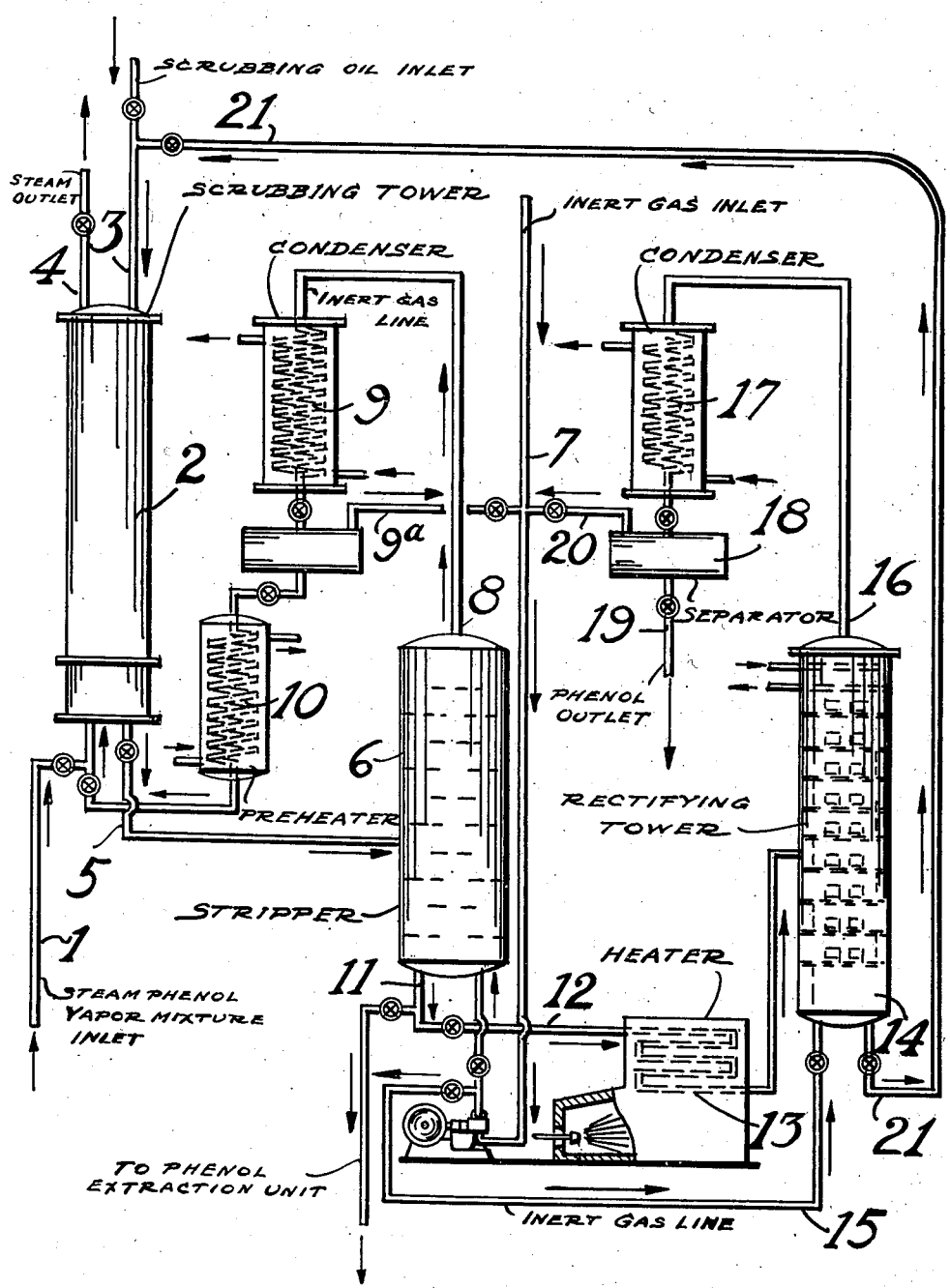

2,096,871

UNITED STATES PATENT OFFICE 2,096,871

RECOVERY OF PHENOL FROM A CONSTANT BOILING MIXTURE OF PHENOL AND WATER

George T. Atkins, Jr., Baytown, Tex., assignor to Standard Oil Development Company, a corporation of Delaware Application October 26, 1935, Serial No. 46,864

4 Claims. (Cl. 260—154)

In recent years the process of refining oils, particularly lubricating oils, by extracting undesirable constituents with phenol has gained wide recognition as a highly desirable refining step. In general, the process consists in treating an oil with phenol at a temperature at which phenol is liquid, whereby two layers of liquid are formed, the one layer, known as the extract, containing most of the phenol and the undesirable constituents extracted from the oil, and the other layer, known as the raffinate, consisting of the refined oil and up to about 20% phenol. The phenol is then recovered from both the extract and the raffinate by distillation. After distillation the raffinate is usually steam-stripped to remove the last traces of phenol.

During the extraction with phenol any water in the oil associates itself with the phenol both in the extract and in the raffinate. In the recovery of phenol from the raffinate and extract by distillation, any water in either portion of the oil forms with the phenol a lower boiling mixture than the phenol itself. Consequently, a water phenol mixture is taken off as an overhead in these distillations and pure phenol is taken off preferably as a side stream. In addition, a further amount of phenol water mixture is obtained by the steam-stripping of the raffinate. As a result the process is accompanied by the accumulation of large quantities of phenolic water containing substantial amounts of phenol. In order to realize the full benefit of the process as a whole and to put it on a practical basis, it is necessary to revover the phenol from the phenolic water. It is to such a recovery process that this invention is directed.

The separation of phenol from phenolic water presents a difficult problem. The volatility of phenol, when dissolved in water, is abnormally high, so that the separation of these two substances by direct distillation cannot be completely effected even when extraordinary care is exercised. On the other hand, the affinity of phenol for water is sufficiently strong that the treatment of an aqueous solution of phenol with any of those solvents which, up to the present, have been found to be selective for phenol, will not effect a satisfactory separation of the phenol from the water.

Prior to the present invention the methods of recovery had been reduced to two which were selected, not because they were eminently satisfactory, but because, although each one was attended by many objectionable features they were the most satisfactory that had been evolved. Of these methods, the most commonly employed has been the salting out process in which phenol is precipitated from phenolic water by addition of sodium chloride. This process is necessarily discontinuous in nature. It adds a considerable labor charge to the phenol extraction process as a whole, it introduces into the process an additional ingredient which is lost in the performance of its function, and it results in a satisfactory recovery of phenol only at the expense of purity.

The above enumerated and other objectionable features of the salting out process led to an investigation of the possibility of recovering phenol from phenolic water by distillation under vacuum. After considerable experimental work it was found possible by this method to reduce the amount of phenol in phenolic water from about 10% to between 2.9 and 3.5% by the employment of a vacuum of from 10 to 20 mms. This recovery was not quite as good as could be obtained by the salting out process. This decreased recovery was compensated, however, by the fact that the vaccum distillation is a continuous process and does not require the introduction into the process of extraneous materials. On the other hand the best recovery could be obtained only in a distillation tower of low capacity and with an extremely careful regulation of operating conditions. A fair conception of the difficulty of control attending recovery by vacuum distillation can be obtained by consideration of the facts that under an absolute pressure of 10 mms. of mercury the difference between the boiling point of water and that of a 70% aqueous solution of phenol is only 2° F., and the difference between the boiling points of the same liquids under 20 mms. of mercury and under 50 mms. of mercury is only 3° F.

The present invention, in its most specific aspect, is based on a realization of the fact that, when phenolic water is vaporized, the special affinity of the two components for each other disappears, whereby, by the choice of a suitable solvent, the phenol vapor can be readily separated from the water vapor. Practical considerations instantly point to the use, as a solvent for this purpose, of the oil which is to be phenol extracted. This expedient simplifies the phenolic extraction process as a whole, makes possible a more complete recovery of phenol from phenolic water than was hitherto attainable, and, in effecting the recovery of phenol, places it directly in its proper functional relationship with the oil for the phenol extraction process. However, in some cases it might be desirable to use the phenol-free extract as the solvent, returning this solvent, together with dissolved phenol, to the distillation process for separating extract and phenol. The merits of this procedure would be that the ratio of solvent to phenolic water in the absorbing tower could be varied independently of other operating conditions and could be as high as desirable (within the capacity limits of the equipment used), and that the extract possesses a greater affinity for phenol than does the untreated oil. A more complete recovery of phenol would result from the increased ratio of solvent to phenolic water, and from the greater solvent power of the extract.

If it be desired to recover phenol as a solid in its pure state, it is preferable to employ, as the scrubbing agent for the phenolic water vapors, a pure chemical compound having a single fixed boiling point widely removed from that of phenol, or having a fixed melting point substantially different from that of phenol whereby the phenol can be recovered from the scrubbing agent by distillation or crystallization. Examples of such pure compounds as may be employed are naphthalene, ortho-toluidine and alkyl derivatives of aniline. Generally, however, there is a sufficient difference between physical properties of phenol and lubricating oil itself to render the use of lubricating oil entirely feasible when it is desired to recover phenol as a solid in its pure state.

The principle involved is the separation of a constant boiling mixture (in which the partial pressures of both components are abnormally high as judged by Raoult's law) by the production of a liquid phase in which one of the components, A, (such as phenol) will have a partial pressure approaching as a minimum the partial pressure predicted by Raoult's law; and in which the other component, B, (such as water) will have a partial pressure greater than that predicted by Raoult's law and a greater positive deviation from Raoult's law than it had in the constant boiling mixture. Under these conditions the vapor evolved is richer in component B than was the original mixture. The absorbent, C, (such as a high-boiling mixture of hydrocarbons) need not possess chemical affinity for either component, but will exert its solvent power for component A solely by virtue of establishing a liquid phase in which component A more nearly obeys Raoult's law. In selecting an absorbent which will have this property, it is convenient to consider the internal pressures, or the dielectric constants, or the solubilities in some reference substance, of the two components and of the absorbent; or to consider published lists (Hildebrand, "Solubility", Chemical Catalogue Co., 1924) of substances based on the above properties such that substances having similar values of these properties and standing adjacent in these lists form solutions showing only small departures from Raoult's law, whereas substances having different values of these properties and standing far apart in these lists show large departures from Raoult's law. These properties and lists are mentioned since those absorbents are usually particularly effective which stand in such lists in the order BAC; especially where the property considered is internal pressure at the distillation temperature (or latent heat of vaporization per unit volume of liquid) and where the internal pressure of B is greater than that of A, and the internal pressure of A is greater than that of C but nearly equal to that of one liquid phase present. There may be one, two, or three liquid phases in contact, but it is necessary and sufficient that one liquid phase be produced in which component A shall have a smaller positive deviation from Raoult's law then it (component A) has in the mixture of A and B to be separated.

In general, the solvent selected in any given instance, for the separation of one component from a mixture thereof with one or more other components, should have the following properties:

1. It should be a liquid at the temperature of operation,
2. It should be substantially non-volatile at these temperatures, or at least have a low volatility,
3. It must be a good solvent for one of the components,
4. It must be a very poor solvent for the other component, or components, and substantially immiscible therewith in the liquid state,
5. It should be such a substance that it exercises its function through purely physical solvent action, although such substances as enter into loose chemical combination with the component which is sought to be extracted from the mixture can be employed. Its solvent action for the other components of the mixture should not increase unduly as the selected component dissolves in it,
6. It must be possible to recover the dissolved component from the solvent without undue difficulty,
7. It must be stable.

In its preferred form the process, according to the present invention, is carried out by introducing a vapor mixture of phenol and water to the bottom of a scrubbing tower into the top of which a scrubbing agent is introduced. The scrubbing agent is usually introduced at a temperature above the vaporization point of water. The temperature in the tower should not be allowed to exceed that at which the phenol will dissolve in it. In general, when the process is conducted under atmospheric pressure the phenolic water vapor enters the tower at a temperature up to about 270° F., preferably between 230 and 250° F., and the scrubbing agent enters the tower at a temperature up to 230° F., preferably between 213 and 225° F., although it may be introduced at a temperature below the boiling point of water so long as it is not introduced at such temperatures in sufficient quantities to reduce the temperature of the vapors in the tower below the condensing point of water.

If the original vapor is very rich in phenol it is preferable to partially cool the vapor so as to deposit liquid phenol containing only a small amount of water. This condensate is easily dehydrated by boiling. The lean vapor can then be subjected to scrubbing. This initial condensation has the advantage that it will leave a vapor which has a condensation temperature about that of water. This vapor should then be scrubbed at a temperature as little as possible above 212° F., as a low scrubbing temperature always increases the solubility of the phenol in the oil.

The process may be conducted under any desired pressure. The chief advantage of employing reduced pressure is that it enables the scrubbing to be conducted at a lower temperature. Whether or not reduced pressure is employed depends largely on the relative costs of supplying heat and creating vacuum.

In general, the scrubbing agent will be employed in excess over the phenolic water. Other things being the same, the greater the ratio between the scrubbing agent and the phenolic water, the greater will be the percentage recovery of phenol. The only upper limit on the quantity of scrubbing agent employed is a practical limit determined by balancing phenol losses against cost of equipment, plant capacity, and operating cost.

In the accompanying drawing in which a plant, suitable for the carrying out of the process according to the present invention, is illustrated diagrammatically, a steam phenol vapor mixture is introduced through line 1 into a scrubbing tower 2 which may be packed with a suitable filling material, such as Raschig rings, or provided with interior construction, such as baffle plates or disc- and-doughnut plates. Scrubbing oil is fed to the top of tower 2 through line 3. Steam is discharged from tower 2 through line 4, and may be sent in a conventional manner through preheaters for the recovery of its heat.

The phenol dissolved in the scrubbing medium leaves tower 2 through line 5, and is discharged into a stripping tower 6 in which it flows downwardly in counter-current to a hot inert gas introduced through line 7 whereby it is stripped of any absorbed water. The inert gas leaves stripping tower 6 through line 8, passes through a condenser 9 in which it is separated from any steam and phenol which it carries over, and then passes through line 10 back to line 7 for recycling. The water, containing some phenol recovered in condenser 9, is passed through preheater 10 where it is vaporized and then passed into line 1 with the fresh phenolic water vapors.

The dry solution of phenol in oil leaves tower 6 through line 11 in which it may be conducted directly to a phenol extraction unit. In the event that it is desired to recover pure phenol, the oil solution of phenol is conducted through line 12 to a preheater 13 in which it is heated to a temperature above the vaporizing temperature of phenol, and is then flashed into a rectifying tower 14. To facilitate the rectification, inert gas from supply line 7 is introduced into the bottom of tower 14 through line 15. The inert gas, carrying vapors of phenol, leaves tower 14 through line 16, passes through condenser 17 into a separator 18 from the bottom of which phenol is drawn off through line 19 and from the top of which inert gas is recycled through line 20 back to supply line 7. Scrubbing oil, or other medium, leaves tower 14 through line 21 in which it is conducted back to feed line 3.

The process, according to the present invention, may be further illustrated by the following data obtained from a series of runs in which phenolic water, containing approximately 9.6% of phenol by weight, was fed to the scrubbing tower at a rate of approximately 700 ccs. per hour.

bricating stock having a gravity of 23.5° A. P. I. and a flash of 520° F. In Runs 6, 7, 8 and 9 the oil containing the absorbed phenol leaving tower 2 was substantially dry and was suitable for direct addition to the phenol extraction unit without being stripped by inert gas.

Run 2 illustrates the effect of maintaining the bottom of the scrubbing tower at too high a temperature. Run 4 is included to demonstrate the effect of the ratio of oil to phenolic water on the percent of phenol recovered. Run 8 demonstrates the importance of employing, as a scrubbing medium, a substance of high mobility, the oil used in Run 8 having been more viscous than the oil employed in the other runs. The effect of this higher viscosity was particularly noticeable because the run was conducted under a partial vacuum and corresponding low temperatures.

The advantages of this method of separation, as compared to separation by distillation under different pressures with intermediate separation of liquid phases, are:

(1) Lower reflux ratios can be used resulting in smaller tower diameters and lower heat inputs, (2) Fewer trays of bell-caps need be installed because of sharper separation, (3) The entire process can be performed at atmospheric pressure, (4) No separation of liquid phases with intermediate cooling is required, (5) Only one tower is required for the removal of water, so that in the phenol treating of lube oils, the oil-phenol mixture can be separated in the main equipment, (6) No chemicals for "salting out" are required.

While the present invention has been described with particular reference to phenolic water obtained from a phenol extraction process, it is obvious that the particular source of the phenolic water is of no special significance in the measurement of the scope of the process. It is to be understood also, that, while the specific method of recovery described above is possessed of unusual merit when employed in conjunction with a phenol extraction plant and in such a combination constitutes the preferred form of the present invention, the application of the present invention is in no way limited to a phenol extraction plant, or to the recovery of phenol from phenolic water by an oil which is subsequently to be extracted with phenol, but is general in nature and embraces the recovery of phenol from phenolic water from any source by extracting the phenol from a vapor mixture thereof with water by scrubbing with any solvent for phenol which is immiscible with water and which is liquid at the temperature of the phenol-water vapor mixture.

Applicant contemplates within the scope of his

| Run No. | | 1 | 2 | 3 | 4 | 5 | 6 | 7 | 8 | 9 | 10 |
|---|---|---|---|---|---|---|---|---|---|---|---|
| Oil/phenolic water ratio by vol. | | 3.9 | 4.2 | 5.2 | 1.8 | 5.0 | 7.8 | 6.7 | 7.0 | 7.3 | 6.7 |
| Percent phenol in overhead | | 1.55 | 2.7 | 0.81 | 3.95 | 1.46 | 0.82 | 1.1 | 1.8 | 1.0 | 0.6 |
| Percent phenol recovery | | 88.3 | 74.0 | 94.0 | 61.0 | 87.7 | 93.9 | 89.0 | 81.5 | 90.0 | 94.0 |
| Flash temp. | °F. | 254 | 246 | 225 | 235 | 230 | 232 | 145 | 220 | 145 | 140 |
| Bottom temp. | °F. | 224 | 273 | 237 | 237 | 257 | 250 | 130 | 170 | 145 | 143 |
| Oil feed temp. | °F. | 197 | 223 | 225 | 226 | 218 | 213 | 110 | 180 | 125 | 119 |
| Vapor temp. | °F. | 216 | 216 | 215 | 215 | 215 | 215 | 120 | 180 | 135 | 140 |
| Pressure—mm. abs. | | Atmospheric | | | | | | 88 | 367 | 136 | 143 |

The oil employed as a scrubbing medium in each run, except Run 8, was an untreated lubricating stock suitable for phenol extraction having a gravity of 24.5° A. P. I. and a flash of 440° F. In Run 8 the scrubbing medium was a luinvention not only the separation of phenol from water, but the separation from aqueous solution of substances, such as the cresols which, while they have a considerably higher boiling point than that of water, are readily volatile in steam and are therefore difficult to separate from water by distillation. The substances advantageously handled are all those volatile substances which, as liquids, possess definite but limited mutual solubilities. Such specific mixtures as aniline and water, nitro-benzene and water, furfural and water may be mentioned. The separation of non-aqueous mixtures is also contemplated.

The nature and objects of the present invention having been thus described and practical embodiments of the same having been given without any intention of thereby defining the scope of said invention, what is claimed as new and useful and desired to be secured by Letters Patent is:

1. In the extraction of an oil with phenol in which an extract and a raffinate are formed and phenol is recovered therefrom with the formation of a constant boiling mixture of phenol and water, the steps which comprise vaporizing the mixture of phenol and water and contacting said vapors at a temperature sufficient to maintain them in the vapor state with oil which is to be extracted with the phenol, and separating said oil with its dissolved phenol from the treated vapors.

2. Process according to claim 1 in which the phenolic water vapor is passed in counter-current to the oil.

3. The process according to claim 1 in which the treatment of the phenolic water vapor with the oil is conducted under sub-atmospheric pressure.

4. In the extraction of an oil with phenol in which an extract and a raffinate are formed and phenol is recovered therefrom with the formation of a constant boiling mixture of phenol and water, the steps which comprise vaporizing the mixture of phenol and water, contacting said vapors at a temperature sufficient to maintain them in a vapor state with a menstruum selected from the group consisting of the oil which is to be extracted with the phenol and the extract obtained after removal therefrom of the phenol and separating the menstruum with its dissolved phenol from the treated vapors.

GEORGE T. ATKINS, Jr.